United States Patent
Hwang et al.

(10) Patent No.: US 12,441,612 B2
(45) Date of Patent: Oct. 14, 2025

(54) METHOD FOR PREPARING SYNTHESIS GAS

(71) Applicant: LG CHEM, LTD., Seoul (KR)

(72) Inventors: Sung June Hwang, Daejeon (KR); Tae Woo Kim, Daejeon (KR); Sik Ki, Daejeon (KR); Sung Kyu Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 729 days.

(21) Appl. No.: 17/800,496

(22) PCT Filed: Dec. 12, 2021

(86) PCT No.: PCT/KR2021/018821
§ 371 (c)(1),
(2) Date: Aug. 17, 2022

(87) PCT Pub. No.: WO2022/270702
PCT Pub. Date: Dec. 29, 2022

(65) Prior Publication Data
US 2023/0159327 A1    May 25, 2023

(30) Foreign Application Priority Data
Jun. 24, 2021    (KR) .......... 10-2021-0082466

(51) Int. Cl.
*C01B 3/34*    (2006.01)
*B01D 3/14*    (2006.01)
*C10G 7/00*    (2006.01)

(52) U.S. Cl.
CPC .......... *C01B 3/34* (2013.01); *B01D 3/14* (2013.01); *C10G 7/00* (2013.01);
(Continued)

(58) Field of Classification Search
CPC . B01D 3/14; B01D 3/143; B01D 3/38; C10G 2300/1077; C10G 9/00;
(Continued)

(56) References Cited

U.S. PATENT DOCUMENTS

2014/0209508 A1    7/2014  Hassan et al.
2016/0369188 A1    12/2016 Housmans et al.
(Continued)

FOREIGN PATENT DOCUMENTS

CN    101418235 A    4/2009
CN    109054875 A    12/2018
(Continued)

*Primary Examiner* — Coris Fung
*Assistant Examiner* — Thomas A Gilchrist
(74) *Attorney, Agent, or Firm* — Bryan Cave Leighton Paisner LLP

(57) ABSTRACT

Provided is a method for preparing synthesis gas, and more particularly, a method for preparing synthesis gas including: supplying a cracked gas stream discharged from a cracking furnace of a naphtha cracking center (NCC) process to a gasoline fractionator, separating a side discharge stream from the gasoline fractionator using a first stripper, and separating a lower discharge stream from the gasoline fractionator using a second stripper, wherein a mixed oil stream of a PGO stream and a PFO stream formed by controlling a flow rate of each stream are used.

12 Claims, 1 Drawing Sheet

(52) U.S. Cl.
CPC ............ *C01B 2203/0272* (2013.01); *C01B 2203/063* (2013.01); *C01B 2203/1235* (2013.01); *C01B 2203/1258* (2013.01); *C10G 2300/104* (2013.01)

(58) Field of Classification Search
CPC .... C10G 2300/107; C10G 47/00; C10G 7/12; C10G 2400/30; C10G 35/00; C10G 47/32; C10G 49/007; C10G 65/00; C10G 9/36; C10G 2300/104; C10G 2400/20; C10G 45/44; C10G 69/06; C10G 7/00; C10G 11/20; C10G 2300/202; C10G 2300/30; C10G 2300/4025; C10G 2300/4081; C10G 2300/70; C10G 2400/06; C10G 55/06; C10G 65/12; C10G 65/14; C10G 1/086; C10G 2/30; C10G 2300/1044; C10G 2300/1048; C10G 2300/1051; C10G 2300/1055; C10G 2300/1059; C10G 2300/1074; C10G 2300/302; C10G 2300/308; C10G 2400/02; C10G 2400/08; C10G 2400/26; C10G 45/00; C10G 45/02; C10G 45/58; C10G 65/10; C10G 65/18; C10G 67/04; C10G 67/0445; C10G 69/02; C10G 69/14; C10G 47/02; C10G 49/02; C10G 67/00; B01J 2229/36; C10K 3/00; C10K 585/80; C10K 422/129; C10K 137/01; C01B 3/34; C01B 2203/0272; C01B 2203/063; C01B 2203/1235; C01B 2203/1258; C01B 3/32; C01B 2203/1211; C01B 2203/1247; C10J 3/466; C10J 2300/0956; C10J 2300/0959; C10J 2300/0989
See application file for complete search history.

(56) References Cited

U.S. PATENT DOCUMENTS

| | | | | |
|---|---|---|---|---|
| 2018/0312767 | A1* | 11/2018 | Al-Sayed | ............... C07C 4/025 |
| 2019/0203130 | A1 | 7/2019 | Mukherjee | |

FOREIGN PATENT DOCUMENTS

| | | | |
|---|---|---|---|
| CN | 111704934 | A | 9/2020 |
| EP | 3 708 637 | A1 | 9/2020 |
| JP | 2008-050303 | A | 3/2008 |
| JP | 2014-518924 | A | 8/2014 |
| JP | 6527216 | B2 | 6/2019 |
| JP | 2020500965 | A | 1/2020 |
| JP | 2020-517797 | A | 6/2020 |
| KR | 100486162 | B1 | 4/2005 |
| KR | 20150110636 | A | 10/2015 |
| KR | 20170089253 | A | 8/2017 |
| KR | 20180006937 | A | 1/2018 |
| KR | 20190082126 | A | 7/2019 |
| KR | 20200091497 | A | 7/2020 |
| KR | 20210007893 | A | 1/2021 |
| RU | 2178447 | C1 | 1/2002 |
| WO | 2015/000841 | A1 | 1/2015 |
| WO | 2020115659 | A1 | 6/2020 |
| WO | 2020/227613 | A1 | 11/2020 |

\* cited by examiner

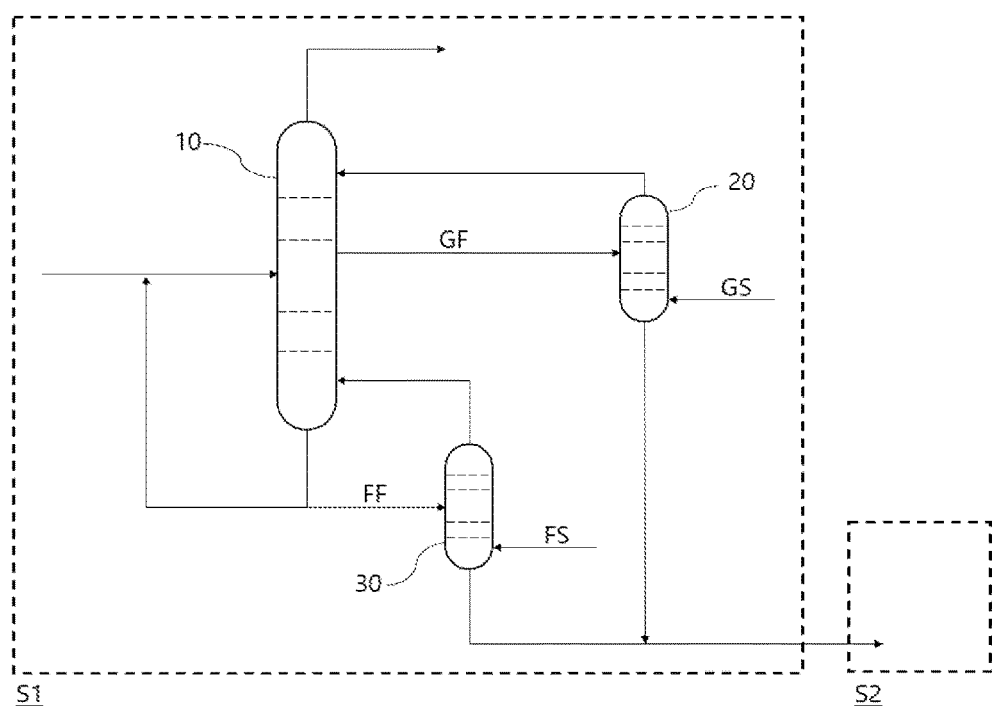

METHOD FOR PREPARING SYNTHESIS GAS

CROSS-REFERENCE TO RELATED APPLICATIONS

The present application is a National Phase entry pursuant to 35 U.S.C. § 371 of International Application No. PCT/KR2021/018821, filed on Dec. 12, 2021, and claims the benefit of and priority to Korean Patent Application No. 10-2021-0082466, filed on Jun. 24, 2021, the entire contents of which are incorporated by reference in their entirety for all purposes as if fully set forth herein.

TECHNICAL FIELD

The present invention relates to a method for preparing synthesis gas, and more particularly, to a method for preparing synthesis gas which allows pyrolyzed fuel oil (PFO) from a naphtha cracking center (NCC) process to be used as a raw material of a gasification process.

BACKGROUND ART

Synthesis gas (syngas) is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly composed of oxygen and carbon monoxide by pyrolysis or a chemical reaction with a gasifying agent such as oxygen, air, and water vapor. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised.

Meanwhile, a pyrolysis fuel oil (PFO), which is a by-product discharged from a naphtha cracking center (NCC) process which is a process of preparing petrochemical basic materials such as propylene, is generally used as a fuel, but since the sulfur content is a high level for using the oil as a fuel without a pretreatment and a carbon dioxide ($CO_2$) emission coefficient is large for use as a fuel, the market is getting smaller due to the environmental regulations and a situation where sales are impossible in the future should be prepared.

Thus, though a method of replacing the raw material of a gasification process with the pyrolysis fuel oil was considered, in order to use the pyrolysis fuel oil as the raw material of a gasification process, the pyrolysis fuel oil is heated to lower a kinematic viscosity, but the kinematic viscosity of the pyrolysis fuel oil is high, so that it was difficult to satisfy the kinematic viscosity conditions for use as the raw material of the gasification process at a flash point or lower.

Accordingly, the present inventors completed the present invention based on the idea that when the pyrolysis fuel oil (PFO) of the naphtha cracking center (NCC) process is used as the raw material of the gasification process, greenhouse gas emissions may be reduced, operating costs of the gasification process may be reduced, and process efficiency may be improved, as compared with the case of using the conventional refinery residue as a raw material. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

DISCLOSURE

Technical Problem

An object of the present invention is to provide a method for preparing synthesis gas which may reduce greenhouse gas emissions, reduce operating costs of a gasification process, and improve process efficiency, as compared with the case of a conventional refinery residue as a raw material, by using the pyrolysis fuel oil (PFO) of a naphtha cracking center (NCC) process as the raw material of the gasification process.

Technical Solution

In one general aspect, a method for preparing synthesis gas includes: supplying a cracked gas stream discharged from a cracking furnace of a naphtha cracking center (NCC) process to a gasoline fractionator; supplying a side discharge stream of the gasoline fractionator to a first stripper, operating the first stripper under conditions in which a first steam stream is supplied to the first stripper, and separating a pyrolysis gas oil (PGO) stream including a PGO from a lower portion of the first stripper; splitting a lower discharge stream from the gasoline fractionator into a reflux stream and a supply stream, supplying the supply stream to a second stripper, and operating the second stripper under conditions in which a second steam stream is supplied to the second stripper, and separating a pyrolysis fuel oil (PFO) stream including a PFO from a lower portion of the second stripper; and supplying a mixed oil stream of the PGO stream and the PFO stream to a combustion chamber for a gasification process to obtain synthesis gas, wherein the method satisfies the following Equations 1 and 2:

$$G \geq 0.5, G = GS/GF \qquad [\text{Equation 1}]$$

$$F \leq 0.035, F = FS/FF \qquad [\text{Equation 2}]$$

wherein GF is a flow rate of the side discharge stream from the gasoline fractionator, GS is a flow rate of the first steam stream, FF is a flow rate of the supply stream, and FS is a flow rate of the second steam stream.

Advantageous Effects

According to the present invention, by using a pyrolysis fuel oil (PFO) of the naphtha cracking center (NCC) process as a raw material of a gasification process, greenhouse gas emissions may be reduced, operating costs of the gasification process may be reduced, and process efficiency may be improved, as compared with the case of using a conventional refinery residue as a raw material.

BRIEF DESCRIPTION OF DRAWINGS

FIG. 1 is a process flow diagram for a method for preparing synthesis gas according to an exemplary embodiment of the present invention.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

The term "stream" in the present invention may refer to a fluid flow in a process, or may refer to a fluid itself flowing in a pipe. Specifically, the stream may refer to both a fluid itself flowing in a pipe connecting each device and a fluid flow. In addition, the fluid may refer to a gas or liquid, and a case in which a solid substance is included in the fluid is not excluded.

In the present invention, the term "C#" in which "#" is a positive integer represents all hydrocarbons having #carbon atoms. Therefore, the term "C8" represents a hydrocarbon compound having 8 carbon atoms. In addition, the term "C#–" represents all hydrocarbon molecules having #or less carbon atoms. Therefore, the term "C8–" represents a mixture of hydrocarbons having 8 or less carbon atoms. In addition, the term "C#+" represents all hydrocarbon molecules having #or more carbon atoms. Therefore, the term "C10+ hydrocarbon" represents a mixture of hydrocarbons having 10 or more carbon atoms.

Hereinafter, the present invention will be described in more detail with reference to FIG. 1 for better understanding of the present invention.

According to the present invention, a method for preparing synthesis gas (syngas) is provided. The method for preparing synthesis gas may include: supplying a cracked gas stream discharged from a cracking furnace of a naphtha cracking center process (S1) to a gasoline fractionator 10; supplying a side discharge stream of the gasoline fractionator 10 to a first stripper 20, operating the first stripper under conditions in which a first steam stream is supplied, and separating a PGO stream including a pyrolysis gas oil (PGO) from a lower portion; splitting a lower discharge stream from the gasoline fractionator 10 into a reflux stream and a supply stream, supplying the supply stream to a second stripper 30, and operating the second stripper 30 under conditions in which a second steam stream is supplied, and separating a PFO stream including a pyrolysis fuel oil (PFO) from a lower portion; and supplying a mixed oil stream of the PGO stream and the PFO stream to a combustion chamber for a gasification process (S2).

The synthetic gas is an artificially prepared gas, unlike natural gas such as spontaneous gas, methane gas, and ethane gas, which is released from land in oil fields and coal mine areas, and is prepared by a gasification process.

The gasification process is a process of converting a hydrocarbon such as coal, petroleum, and biomass as a raw material into synthesis gas mainly including oxygen and carbon monoxide by pyrolysis or a chemical reaction with a gasifying agent such as oxygen, air, and water vapor. Specifically, the synthesis gas in the present invention may include hydrogen and carbon monoxide. A gasifying agent and a raw material are supplied to a combustion chamber positioned at the foremost end of the gasification process to produce synthesis gas by a combustion process at a temperature of 700° C. or higher, and as a kinematic viscosity of the raw material supplied to the combustion chamber is higher, a differential pressure in the combustion chamber is increased or atomization is not performed well, so that combustion performance is deteriorated or a risk of explosion is increased due to excessive oxygen.

Conventionally, as a raw material of a gasification process for preparing synthesis gas using a liquid phase hydrocarbon raw material, refinery residues, such as vacuum residues (VR) and bunker-C oil, discharged from refinery where crude oil is refined were mainly used. However, since the refinery residue has a high kinematic viscosity, a pretreatment such as a heat treatment, a diluent, or water addition is required to be used as the raw material of the gasification process, and since the refinery residue has high contents of sulfur and nitrogen, production of acidic gas such as hydrogen sulfide and ammonia is increased during the gasification process, and thus, in order to respond to tightened environmental regulations, a need to replace the refinery residue with raw materials having low contents of sulfur and nitrogen is raised. For example, among the refinery residues, a vacuum residue may include about 3.5 wt % of sulfur and about 3600 ppm of nitrogen, and bunker C-oil may include about 4.5 wt % of sulfur.

Meanwhile, a pyrolysis fuel oil (PFO) discharged from a naphtha cracking center process which is a process of cracking naphtha to prepare petrochemical basic materials such as ethylene and propylene is generally used as a fuel, but since the sulfur content is a high level for using the oil as a fuel without a pretreatment, the market is getting smaller due to the environmental regulations and a situation where sales are impossible in the future should be prepared.

Thus, though a method of replacing the raw material of a gasification process with the pyrolysis fuel oil was considered, in order to use the pyrolysis fuel oil as the raw material of a gasification process, the pyrolysis fuel oil is heated to lower a kinematic viscosity, but the kinematic viscosity of the pyrolysis fuel oil is high, so that it was difficult to satisfy the kinematic viscosity conditions for use as the raw material of the gasification process at a flash point or lower.

Therefore, in the present invention, it is intended that greenhouse gas emissions may be reduced, operating costs of a gasification process are reduced, and process efficiency is improved, as compared with a case of using a conventional refinery residue as a raw material, by developing process conditions for using a PFO stream including a pyrolysis fuel oil (PFO) and a PGO stream including a pyrolysis gas oil (PGO) discharged from a naphtha cracking center process as the raw material of the gasification process.

According to an exemplary embodiment of the present invention, the PFO stream including a pyrolysis fuel oil (PFO) and the PGO stream including a pyrolysis gas oil (PGO) may be discharged from a naphtha cracking center process (S1).

Specifically, the naphtha cracking center process is a process of cracking naphtha including paraffin, naphthene, and aromatics to prepare olefins such as ethylene and propylene used as a basic material for petrochemicals, and may be largely composed of a cracking process, a quenching process, a compression process, and a refining process.

The cracking process is a process of cracking naphtha into hydrocarbons having fewer carbons in a cracking furnace at 800° C. or higher, and may discharge cracked gas at a high temperature. Here, the naphtha may undergo a preheating process from high pressure water vapor before entering the cracking furnace, and then may be supplied to the cracking furnace.

The quenching process is a process of cooling the cracked gas at a high temperature, for suppressing a polymerization reaction of a hydrocarbon in cracked gas at a high temperature discharged from the cracking furnace, and recovering waste heat and decreasing a heat load in a subsequent process (compression process). Here, the quenching process may include primary cooling of the cracked gas at a high temperature with quench oil and secondary cooling with quench water.

Specifically, in the primary cooling, the cracked gas may be supplied to a gasoline fractionator to separate light oils including hydrogen, methane, ethylene, propylene, and the like, raw pyrolysis gasoline (RPG), the pyrolysis fuel oil (PFO), and the pyrolysis gas oil (PGO) therefrom. Thereafter, the light oils may be transported to a subsequent compression process.

The compression process may be a process of producing compressed gas having a reduced volume by elevating pressure of the light oils under high pressure for economically separating and refining the light oils.

The refining process is a process of cooling the compressed gas which is compressed with high pressure to a cryogenic temperature and then separating the components in stages by a boiling point difference, and may produce hydrogen, ethylene, propylene, propane, C4 oils, raw pyrolysis gasoline (RPG), and the like.

As described above, from the quenching process of the naphtha cracking center process (S1), a pyrolysis fuel oil (PFO) and a pyrolysis gas oil (PGO) may be discharged. In general, the pyrolysis fuel oil (PFO) includes about 0.1 wt % or less of sulfur and about 20 ppm or less of nitrogen, and when it is used as a fuel, sulfur oxides (SOx) and nitrogen oxides (NOx) are discharged during a combustion process, and thus, environmental issues may be raised, but when PFO is used as the raw material of synthesis gas, the emission level is low.

Accordingly, in the present invention, the above problems may be solved by using the pyrolysis fuel oil (PFO) and the pyrolysis gas oil (PGO) discharged while controlling process conditions in the naphtha cracking center process (S1) as the raw material of the gasification process for preparing synthesis gas, and furthermore, greenhouse gas emissions may be reduced, operating costs of the gasification process may be reduced, and process efficiency may be improved, as compared with a case of using a conventional refinery residue as the raw material of the gasification process.

According to an exemplary embodiment of the present invention, as described above, the PFO stream and the PGO stream of the present invention may include the pyrolysis fuel oil (PFO) and the pyrolysis gas oil (PGO) discharged from the gasoline fractionator 10 of the naphtha cracking center process (S1), respectively. As a specific example, with respect to the total number of stages of the gasoline fractionator 10, when a top stage is expressed as a stage at 1% and a bottom stage is expressed as a stage at 100%, the pyrolysis fuel oil (PFO) may be discharged from a stage at 90% or more, a stage at 95% or more, or a stage at 95% to 100% relative to the total number of stages of the gasoline fractionator 10. In addition, the pyrolysis gas oil (PGO) may be discharged from a stage at 10% to 70%, a stage at 15% to 65%, or a stage at 20% to 60%. For example, when the total number of stages of the gasoline fractionator 10 is 100, a top stage may be a first stage and a bottom stage may be a 100th stage, and a stage at 90% or more of the total number of stages of the gasoline fractionator 10 may refer to a 90th stage to a 100th stage of the gasoline fractionator 10.

According to an exemplary embodiment of the present invention, the PGO stream is discharged from a side portion of the gasoline fractionator 10 of the naphtha cracking center process (S1), and the side discharge stream including the pyrolysis gas oil (PGO) is supplied to a first stripper 20 and then discharged from a lower portion of the first stripper 20 as a lower discharge stream. Here, the temperature of the side discharge stream of the gasoline fractionator 10 may be 120° C. to 180° C., 120° C. to 175° C., or 130° C. to 175° C.

The operating temperature of the first stripper 20 may be 110° C. to 200° C., 115° C. to 190° C., or 120° C. to 185° C., and the operating pressure thereof may be 0.5 kg/cm$^2$g to 3 kg/cm$^2$g, 0.7 kg/cm$^2$g to 2.5 kg/cm$^2$g, or 0.8 kg/cm$^2$g to 2 kg/cm$^2$g.

The first stripper 20 may be operated under the conditions in which the first steam stream is supplied. For example, the pressure of the first steam stream may be 2 kg/cm$^2$g to 20 kg/cm$^2$g, 2.5 kg/cm$^2$g to 18 kg/cm$^2$g, or 3 kg/cm$^2$g to 16 kg/cm$^2$g. When the first stripper 20 is operated under the operating conditions described above, NCC effective light oils including RPG and the like may be recovered and also the light oils in the PGO stream may be removed to increase the flash point of the PGO stream.

In addition, the PFO stream is discharged from a lower portion of the gasoline fractionator 10 of the naphtha cracking center process (S1), and the lower discharge stream including the pyrolysis fuel oil (PFO) is supplied to a second stripper 30 and then discharged from a lower portion of the second stripper 30 as a lower discharge stream.

The operating temperature of the second stripper 30 may be 150° C. to 350° C., 170° C. to 330° C., or 180° C. to 320° C., and the operating pressure thereof may be 0.6 kg/cm$^2$g to 3.1 kg/cm$^2$g, 0.8 kg/cm$^2$g to 2.6 kg/cm$^2$g, or 0.8 kg/cm$^2$g to 2 kg/cm$^2$g.

The second stripper 30 may be operated under the conditions in which the second steam stream is supplied. For example, the pressure of the second steam stream may be 2 kg/cm$^2$g to 20 kg/cm$^2$g, 2.5 kg/cm$^2$g to 18 kg/cm$^2$g, or 3 kg/cm$^2$g to 16 kg/cm$^2$g. When the second stripper 30 is operated under the operating conditions described above, NCC effective light oils including RPG and the like may be recovered and also the light oils in the PFO stream may be removed to increase the flash point of the PFO stream.

The first stripper 20 and the second stripper 30 may be devices in which a stripping process of separating and removing gas or vapor dissolved in a liquid is performed, and for example, may be performed by a method such as direct contact, heating, and pressing by, for example, steam, inert gas, cracked gas, or the like.

For example, the side discharge stream from the gasoline fractionator 10 is supplied to the first stripper 20, thereby refluxing an upper discharge stream including light oils from the first stripper 20 separated from the side discharge stream from the gasoline fractionator 10 to the gasoline fractionator 10, and discharging the PGO stream from the lower portion.

In addition, the lower discharge stream from the gasoline fractionator 10 is supplied to the second stripper 30, thereby refluxing an upper discharge stream including light oils from the second stripper 30 separated from the lower discharge stream from the gasoline fractionator 10 to the gasoline fractionator 10, and discharging the PFO stream from the lower portion.

Here, the lower discharge stream from the gasoline fractionator 10 may be split into a reflux stream and a supply stream, the reflux stream may join the cracked gas stream and be supplied to the gasoline fractionator 10, and the supply stream may be supplied to the second stripper 30. Here, the temperature of the lower discharge stream from the gasoline fractionator 10 may be 150° C. to 300° C., 170° C. to 270° C., or 180° C. to 250° C.

For example, a ratio of the flow rate of the supply stream to the flow rate of the reflux stream in the lower discharge stream from the gasoline fractionator 10 may be 0.0002 to 0.008, 0.0006 to 0.007, or 0.0014 to 0.006. Herein, the "flow rate" may refer to a flow of a weight per unit hour. As a specific example, the unit of the flow rate may be kg/h.

According to an exemplary embodiment of the present invention, the method for preparing synthesis gas may be operated so that the following Equations 1 and 2 are satisfied:

$$G \geq 0.5, G = GS/GF \qquad \text{[Equation 1]}$$

$$F \leq 0.035, F = FS/FF \qquad \text{[Equation 2]}$$

wherein GF is a flow rate of the side discharge stream from the gasoline fractionator 10, GS is a flow rate of the first steam stream, FF is a flow rate of the supply stream, and FS is a flow rate of the second steam stream.

Equation 1 may represent the ratio of the flow rate of the first steam stream to the flow rate of the side discharge stream from the gasoline fractionator 10. For example, G may be 0.5 or more, 0.5 to 2, 0.5 to 1.5, or 0.5 to 1. When G is controlled within the range, the content of C6– hydrocarbons included in the PGO stream may be controlled to 0.1 wt % or less. Specifically, the C6– hydrocarbons are very light oils which are highly likely to be mixed in the PGO stream and have an extremely low flash point to affect flash point lowering of the PGO stream. In this regard, in the present invention, G is controlled to 0.5 or more, thereby lowering the content of C6– hydrocarbons in the PGO stream to 0.1 wt % or less to raise the flash point of the PGO stream, and furthermore, adjusting the flash point of the mixed oil stream to be high.

Equation 2 may represent the ratio of the flow rate of the second steam stream to the flow rate of the supply stream supplied to the second stripper 30 in the lower discharge stream from the gasoline fractionator 10. For example, F may be 0.035 or less, 0.001 to 0.035, 0.005 to 0.035, or 0.01 to 0.03. When F is controlled to the above range, the content of C8 and C9 hydrocarbons included in the PFO stream may be controlled to 3 wt % or more. Specifically, the C8 and C9 hydrocarbons, which have a not-very-low flash point but have a low viscosity, may lower the viscosity of the PFO stream, and furthermore, may adjust the viscosity to be low while maintaining the flash point of the mixed oil stream.

As a specific example, the first stripper 20 and the second stripper 30 are operated under the conditions satisfying Equations 1 and 2, thereby controlling the compositions of the PGO stream and the PFO stream, and thus, the flash point of the mixed oil stream of the PGO stream and the PFO stream may be raised and the viscosity thereof may be lowered.

When the mixed oil stream of the PGO stream and the PFO stream is used as a simple fuel as before, an operation is performed so that the NCC effective light oils in the PGO stream and the PFO stream are recovered as much as possible or an amount of energy used is minimized, and the specifications such as the flash point and the kinematic viscosity should be satisfied. Specifically, when the first stripper 20 and the second stripper 30 are operated so that the NCC effective light oils in the PGO stream and the PFO stream are recovered as much as possible, both the flash point and the kinematic viscosity of the mixed oil stream are increased, and when the operation is performed so that the amount of energy used is minimized, both the flash point and the kinematic viscosity were decreased. As such, when the first stripper 20 and the second stripper 30 are operated under the common operating conditions, the flash point and the kinematic viscosity of the mixed oil stream are adjusted in the same direction, so that the kinematic viscosity and flash point conditions for use as the raw material of the synthesis gas are not implemented.

In this regard, in the present invention, in order to use the mixed oil stream of the PGO stream and the PFO stream as the raw material of the synthesis gas, the physical properties of the kinematic viscosity and the flash point become important, and specifically, a method of raising the flash point while lowering the kinematic viscosity of the mixed oil stream is provided. Specifically, the first stripper 20 and the second stripper 30 are operated under the conditions in which Equations 1 and 2 are satisfied, the content of light oils in each of the PGO stream and the PFO stream is adjusted to lower the kinematic viscosity of the mixed oil stream and also to raise the flash point, thereby controlling the kinematic viscosity and the flash point to an appropriate level to be used as the raw material of the gasification process.

According to an exemplary embodiment of the present invention, the PGO stream may include 0.1 wt % or less or 0 wt % to 0.1 wt % of C6– hydrocarbons and 72 wt % or more, 72 wt % to 96 wt %, or 76 wt % to 90 wt % of C10 to C12 hydrocarbons, and the PFO stream may include 3 wt % or more or 3 wt % to 15 wt % of C8 and C9 hydrocarbons and 67 wt % or more, 67 wt % to 93 wt %, or 74 wt % to 90 wt % of C13+ hydrocarbons. For example, the PGO stream may have a kinematic viscosity at 40° C. of 5 to 220 cSt and a flash point of 40 to 70° C. In addition, for example, the PFO stream may have a kinematic viscosity at 40° C. of 250 to 70,000 cSt and a flash point of 65 to 190° C. As such, the PFO stream including more heavy hydrocarbons than the PGO stream may have a higher kinematic viscosity and a higher flash point than the pyrolysis gas oil under the temperature conditions.

For example, the C6– hydrocarbons may include one or more selected from the group consisting of ethylene, propylene, butane, pentane, pentene, pentadiene, methylbutene, cyclopentane, cyclopentene, hexane, cyclohexane, and benzene. As a specific example, the C6– hydrocarbons may include all kinds of C6– hydrocarbons described above, but are not limited thereto.

In addition, for example, the C8 and C9 hydrocarbons may include one or more selected from the group consisting of n-octane, n-nonane, ethylbenzene, m-xylene, o-xylene, p-xylene, styrene, ethylcyclohexane, dimethylcyclohexane, dimethylcyclohexadiene, isopropylbenzene, n-propylbenzene, n-propylcyclohexane, indene, and indane. As a specific example, the C8 and C9 hydrocarbons may include all kinds of C8 and C9 hydrocarbons described above, but are not limited thereto.

According to an exemplary embodiment of the present invention, the PGO stream may have a boiling point of 210° C. to 300° C. or 220° C. to 290° C., and the PFO stream may have a boiling point of 270° C. to 530° C. or 275° C. to 500° C.

The boiling points of the PGO stream and the PFO stream may refer to the boiling points of the PGO stream and the PFO stream in a bulk form, each composed of a plurality of hydrocarbons. Here, the kind of hydrocarbons included in the PGO stream and the kind of hydrocarbons included in the PFO stream may be different from each other, and some kinds may be the same. As a specific example, the kind of hydrocarbons included in the PGO stream and the PFO stream may be included as described above.

According to an exemplary embodiment of the present invention, the mixed oil stream of the PGO stream and the PFO stream may be supplied to the combustion chamber for the gasification process (S2).

As described above, a gasifying agent and a raw material are supplied to the combustion chamber (not shown) positioned at the foremost end of the gasification process (S2) to produce synthesis gas by a combustion process at a temperature of 700° C. or higher. Here, the reaction of producing synthesis gas is performed under a high pressure of 20 to 80 atm, and the raw material in the combustion chamber should be moved at a high flow velocity of 2 to 40 m/s. Therefore, the raw material should be pumped at a high flow velocity under a high pressure for the reaction of producing synthesis gas, and when the kinematic viscosity of the raw material supplied to the combustion chamber is higher than an appropriate range, a high-priced pump should be used due to reduced pumpability or costs are increased due to increased energy consumption, and pumping to desired conditions may be impossible. In addition, since pumping is not performed well, the raw material may not be uniformly supplied to the combustion chamber. In addition, since a differential pressure in the combustion chamber is raised or uniform atomization of the raw material is not performed well due to its small particle size, combustion performance may be deteriorated, productivity may be lowered, a large amount of gasifying agent is required, and a risk of explosion is increased due to excessive oxygen. Here, an appropriate range of the kinematic viscosity may be somewhat different depending on the kind of synthesis gas, conditions of the combustion process performed in the combustion chamber, and the like, but generally, a lower kinematic viscosity of the raw material is better in terms of costs, productivity, and safety, at a temperature of the raw material at the time of supply to the combustion chamber in the gasification process (S2), and it is preferred that the kinematic viscosity is in a range of 300 cSt or less and within the range, a differential pressure rise in the combustion chamber is prevented within the range, and atomization is performed well to improve combustion performance.

In addition, when the flash point of the raw material supplied to the combustion chamber is lower than an appropriate range, flame may occur in a burner before combustion reaction occurrence, a risk of explosion is present by a backfire phenomenon of the flame in the combustion chamber, and the refractories in the combustion chamber may be damaged. Here, an appropriate range of the flash point may be varied depending on the kind of synthesis gas to be synthesized, conditions of the combustion process performed in the combustion chamber, and the like, but generally, it is preferred that the flash point of the raw material is in a range of being higher than the temperature of the raw material at the time of supply to the combustion chamber in the gasification process (S2) by 25° C. or more, and within the range, a loss of the raw material, an explosion risk, and damage of refractories in the combustion chamber may be prevented.

Accordingly, in the present invention, the operating conditions of the first stripper 20 and the second stripper 30 are controlled, thereby adjusting the compositions of the PGO stream and the PFO stream to control the composition of the mixed oil stream of the PGO stream and the PFO stream and use the mixed oil stream as the raw material supplied to the combustion chamber in the gasification process (S2), and thus, at the temperature of the mixed oil stream at the time of supply to the combustion chamber, the kinematic viscosity and the flash point of the mixed oil stream may be controlled to appropriate ranges.

According to an exemplary embodiment of the present invention, the temperature of the mixed oil stream at the time of supply to the combustion chamber may be lower than the flash point of the mixed oil stream at the time of supply to the combustion chamber by 25° C. or more and may be a temperature at which the kinematic viscosity is 300 cSt or less. That is, the mixed oil stream may have the kinematic viscosity at the time of supply to the combustion chamber of 300 cSt or less or 1 cSt to 300 cSt, and the flash point of the mixed oil stream may be higher than the temperature at the time of supply to the combustion chamber by 25° C. or more or by 25° C. to 150° C. Here, the temperature of the mixed oil stream at the time of supply to the combustion chamber may be 20° C. to 90° C. or 30° C. to 80° C. The kinematic viscosity of the mixed oil stream at the temperature at the time of supply to the combustion chamber within the range may be 300 cSt or less and may be further lower than the flash point by 25° C. or more, and thus, may satisfy the process operating conditions for use as the raw material of the gasification process (S2).

According to an exemplary embodiment of the present invention, a ratio of the flow rate of the PGO stream in the mixed oil stream (hereinafter, referred to as "flow rate ratio of PGO stream") may be 0.35 to 0.7, 0.35 to 0.65, or 0.4 to 0.6. The mixed oil stream has the controlled contents of the low viscosity/low flash point material and the low viscosity/high flash point material at the flow rate ratio of the PGO stream within the range, thereby satisfying the kinematic viscosity and flash point conditions for use as the raw material of the gasification process (S2).

According to an exemplary embodiment of the present invention, the mixing oil stream may include 3 wt % or less, 0.1 wt % to 2.5 wt %, or 0.001 wt % to 2 wt % of C7-hydrocarbons and 80 wt % or more, 80 wt % to 97 wt %, or 84 wt % to 95 wt % of C10+ hydrocarbons.

For example, the C7− hydrocarbons may include one or more selected from the group consisting of butane, pentane, pentene, pentadiene, methylbutene, cyclopentane, cyclopentene, hexane, cyclohexane, heptane, methylhexane, benzene, and toluene. As a specific example, the C7− hydrocarbons may include all kinds of C7− hydrocarbons described above, but are not limited thereto.

In addition, for example, the C10+ hydrocarbons may include one or more selected from the group consisting of dicyclopentadiene, naphthalene, methylnaphthalene, tetramethylbenzene, fluorene, and anthracene. As a specific example, the C10+ hydrocarbons may include all kinds of C10+ hydrocarbons described above, but is not limited thereto.

According to an exemplary embodiment of the present invention, the boiling point of the mixed oil stream may be 180° C. to 600° C., 190° C. to 550° C., or 200° C. to 500° C.

The boiling point of the mixed oil stream may refer to a boiling point of the mixed oil stream in a bulk form composed of a plurality of hydrocarbons. Here, the kind of hydrocarbons included in the mixed oil stream may include all of C7– hydrocarbons and C10+ hydrocarbons, described above.

Meanwhile, the PGO stream discharged from a general naphtha cracking center process (S1) may include 70 wt % or more or 70 wt % to 95 wt % of C10 to C12 hydrocarbons, and the PFO stream may include 70 wt % or more or 70 wt % to 98 wt % of C13+ hydrocarbons. For example, the PGO stream including 70 wt % or more of C10 to C12 hydrocarbons may have a kinematic viscosity at 40° C. of 1 to 200 cSt and a flash point of 10 to 50° C. In addition, for example, the PFO stream including 70 wt % or more of C13+ hydrocarbons may have a kinematic viscosity at 40° C. of 400 to 100,000 cSt and a flash point of 70 to 200° C. As such, the PFO stream including more heavy hydrocarbons than the PGO stream may have a higher kinematic viscosity and a higher flash point than the pyrolysis gas oil under the same temperature conditions. In addition, the PGO stream may have a boiling point of 200 to 288° C. or 210 to 270° C., and the PFO stream may have a boiling point of 289 to 550° C. or 300 to 500° C.

Here, when the PGO stream is supplied directly to the combustion chamber without a pretreatment process of controlling the composition of the PGO stream, the PFO stream is supplied directly to the combustion chamber without a pretreatment of controlling the composition of PFO stream, or the mixed oil stream of the PGO stream and the PFO stream of which the compositions are not controlled is supplied directly to the combustion chamber, the temperature satisfying both the kinematic viscosity and the flash point in the appropriate ranges described above may not exist.

As such, when the PFO stream, the PGO stream, or the mixed oil stream of the PFO stream and the PGO stream is supplied to the combustion chamber at the temperature which does not satisfy any one of the kinematic viscosity and the flash point in the appropriate ranges, a differential pressure in the combustion chamber is raised or atomization is not performed well to deteriorate combustion performance, and an explosion risk is increased due to excessive oxygen, or flame may occur in the burner before a combustion reaction occurs, and an explosion risk is present by a backfire phenomenon of flame in the combustion chamber and refractories in the combustion chamber may be damaged.

Specifically, the PFO stream and the PGO stream are the heaviest residues in the NCC process and have been used as a simple fuel, and when they are used as a simple fuel as such, it is not necessary to adjust the compositions and the physical properties thereof. However, as in the present invention, in order to use the stream as the raw material of the synthesis gas, specific physical properties, for example, both the kinematic viscosity and the flash point should be satisfied.

In addition, since the PFO stream has a high content of heavy oils, it has a high viscosity, and thus, the viscosity should be lowered by heating for using the PFO stream as the raw material of synthesis gas, and it has a problem of not controlling the kinematic viscosity at a temperature lower than the flash point to the appropriate range. In addition, the PGO stream has a flash point as low as room temperature or lower, so that it may not be used as the raw material of synthesis gas. In addition, the mixed oil stream of the PGO stream and the PFO stream has a ratio of the flow rate of the PGO stream to the flow rate of the entire stream of the PFO stream and the PGO stream of about 0.35 to 0.7, and in this case also, both the kinematic viscosity and the flash point may not be satisfied, and it is difficult to use the stream as the raw material of synthesis gas.

In this regard, in the present invention, the mixed oil stream of the PGO stream and the PFO stream discharged under the conditions in which the operating conditions of the first stripper 20 and the second stripper 30 are controlled is supplied to the combustion chamber as the raw material of the gasification process (S2), whereby when the mixed oil stream is supplied to the combustion chamber, the flash point of the mixed oil stream may be controlled to a range higher than the temperature of the mixed oil stream at the time of the supply by 25° C. or more, and also the kinematic viscosity of the mixed oil stream may be controlled to a range of 300 cSt or less at the temperature of the mixed oil stream at the time of the supply, and thus, the conditions for using the stream as the raw material of the synthesis gas may be satisfied.

According to an exemplary embodiment of the present invention, the mixed oil stream may pass through a heat exchanger (not shown) before being supplied to the combustion chamber for the gasification process (S2) and then be supplied. In this case, the temperature of the mixed oil stream at the time of supply to the gasification process (S2) is adjusted and the sensible heat of the mixed oil stream to be wasted as waste heat is reused in the process using the heat exchanger, thereby reducing process energy.

According to an exemplary embodiment of the present invention, burning the mixed oil stream supplied to the combustion chamber in the gasification process (S2) at a temperature of 700° C. or higher, 700 to 2000° C., or 800 to 1800° C. may be further included. In addition, the mixed oil stream may be supplied to the combustion chamber together with the gasifying agent. Here, the gasifying agent may include one or more selected from the group consisting of oxygen, air, and water vapor, and as a specific example, the gasifying agent may be oxygen or water vapor.

As such, by burning the mixed oil stream at a high temperature in the presence of the gasifying agent, the synthesis gas may be prepared. The synthesis gas prepared according to the preparation method of the present invention includes carbon monoxide and hydrogen and may further include one or more selected from the group consisting of carbon dioxide, ammonia, hydrogen sulfide, hydrogen cyanide, and carbonyl sulfide.

According to an exemplary embodiment of the present invention, in the method for preparing synthesis gas, if necessary, devices such as a valve, a pump, a separator, and a mixer may be further installed.

Hereinabove, the method for preparing synthesis gas according to the present invention has been described and illustrated in the drawings, but the description and the illustration in the drawings are the description and the illustration of only core constitutions for understanding of the present invention, and in addition to the process and devices described above and illustrated in the drawings, the process and the devices which are not described and illustrated separately may be appropriately applied and used for carrying out the method for preparing synthesis gas according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLE

Examples 1 to 4

According to the process flow diagram shown in FIG. 1, synthesis gas was prepared.

Specifically, in the naphtha cracking center process (S1), the cracked gas stream was supplied to the gasoline fractionator 10 and separated.

A side discharge stream discharged from a stage at 40% relative to the total number of stages of the gasoline fractionator 10 was supplied to a first stripper 20, and then the first stripper was operated under the conditions in which the first steam stream at a saturated pressure of 3.5 kg/cm²g is supplied to discharge a PGO stream including a pyrolysis gas oil from the lower portion of the first stripper 20. At this time, the temperature of the side discharge stream from the gasoline fractionator 10 was 150° C., and the operating pressure of the first stripper 20 was 1 kg/cm²g.

In addition, a lower discharge stream discharged from a stage at 100% relative to the total number of stages of the gasoline fractionator 10 was split into a reflux stream and a supply stream, and the reflux stream joined a cracked gas stream and was supplied to the gasoline fractionator 10.

In addition, the supply stream was supplied to a second stripper 30, and operated under the conditions in which a second steam stream at a saturated pressure of 3.5 kg/cm²g is supplied to discharge a PFO stream including a pyrolysis fuel oil (PFO) from the lower portion of the second stripper 30. At this time, the temperature of the lower discharge stream from the gasoline fractionator 10 was 210° C., and the operating pressure of the second stripper 30 was 1.2 kg/cm²g.

The PGO stream and the PFO stream were mixed to form a mixed oil stream, and then the mixed oil stream was supplied to a combustion chamber for a gasification process (S2). At this time, a flow rate ratio of the PGO stream in the mixed oil stream was 0.35.

At this time, a flow rate (GF) of the side discharge stream from the gasoline fractionator 10, a flow rate (FF) of a supply stream supplied to the second stripper in the lower discharge stream from the gasoline fractionator 10, and each of a flow rate (GS) of the first steam stream and a flow rate (FS) of a second steam stream were controlled to control G(GS/GF) and F(FS/FF), which are shown in the following Table 1, and the composition and the kinematic viscosity and flash point at 40° C. of the PGO stream and the PFO stream are shown in the following Table 2.

In addition, the temperature of the mixed oil stream at the time of supply to the combustion chamber, and the flash point and the kinematic viscosity of the mixed oil stream were measured and are shown in the following Table 3. In addition, it was confirmed whether the process operating standards were satisfied according to the measurement results. At this time, the time when the mixed oil stream was supplied to the combustion chamber was set to temperature conditions to control the kinematic viscosity to 300 cSt, using a heat exchanger. Specifically, in order to derive the temperature conditions to control the kinematic viscosity to 300 cSt, the kinematic viscosity of the corresponding sample was measured for each temperature, and then a correlation between the temperature and the viscosity was established, thereby performing calculation using interpolation.

The kinematic viscosity and the flash point were measured as follows, and were applied to all of the examples and the comparative examples.

(1) Kinematic viscosity: A sample was obtained from the stream of the sample to be measured and measurement was performed based on ASTM D7042 using SVM 3001 available from Anton Paar. In addition, the temperature of each of the samples was maintained at a temperature lower than a kinematic viscosity measurement temperature by 10° C., and the sample was stored in a closed container for preventing vaporization of light materials to minimize occurrence of a gas phase.

(2) Flash point: A sample was obtained from the stream of the sample to be measured and measurement was performed based on ASTM D93 using apm-8 available from TANAKA. In addition, the temperature of each of the samples was maintained at a temperature lower than an expected flash point by 10° C., and the sample was stored in a closed container for preventing vaporization of light materials to minimize occurrence of a gas phase.

COMPARATIVE EXAMPLE

Comparative Example 1

The process was performed in the same manner as in Example 1, except that the PFO stream discharged from the lower portion of the second stripper 30 instead of the mixed oil stream was supplied to the combustion chamber for the gasification process.

The temperature of the PFO stream at the time of supply to the combustion chamber was measured and is shown in the following Table 3. In addition, it was confirmed whether the process operating standards were satisfied according to the measurement results. At this time, the time when the PFO stream was supplied to the combustion chamber was set to temperature conditions to control the kinematic viscosity to 300 cSt, using a heat exchanger.

Comparative Example 2

The process was performed in the same manner as in Example 1, except that the PGO stream discharged from the lower portion of the first stripper 20 instead of the mixed oil stream was supplied to the combustion chamber for the gasification process.

The temperature of the PGO stream at the time of supply to the combustion chamber was measured and is shown in the following Table 3. In addition, it was confirmed whether the process operating standards were satisfied according to the measurement results. At this time, the time when the PGO stream was supplied to the combustion chamber was set to temperature conditions to control the kinematic viscosity to 300 cSt, using a heat exchanger.

Comparative Examples 3 to 5

The process was performed in the same manner as in Example 1, except that the flow rate (GF) of the side discharge stream from the gasoline fractionator 10, the flow rate (FF) of a supply stream supplied to the second stripper in the lower discharge stream from the gasoline fractionator 10, and each of the flow rate (GS) of the first steam stream and the flow rate (FS) of the second steam stream was controlled to control G(GS/GF) and F(FS/FF) as shown in the following Table 1. The compositions, and the kinematic viscosity and flash point at 40° C. of the PGO stream and the PFO stream are shown in the following Table 2.

In addition, the temperature of the mixed oil stream at the time of supply to the combustion chamber, and the flash point and the kinematic viscosity of the mixed oil stream were measured and are shown in the following Table 3. In addition, it was confirmed whether the process operating standards were satisfied according to the measurement results. At this time, the time when the mixed oil stream was supplied to the combustion chamber was set to temperature conditions to control the kinematic viscosity to 300 cSt, using a heat exchanger.

TABLE 1

|  | G | F |
|---|---|---|
| Example 1 | 0.6 | 0.03 |
| Example 2 | 0.7 | 0.025 |
| Example 3 | 0.8 | 0.02 |
| Example 4 | 1 | 0.01 |
| Comparative Example 1 | — | 0.03 |
| Comparative Example 2 | 0.6 | — |
| Comparative Example 3 | 0.3 | 0.07 |
| Comparative Example 4 | 0.3 | 0.03 |
| Comparative Example 5 | 0.6 | 0.07 |

TABLE 2

|  | PGO stream | | | PFO stream | | |
|---|---|---|---|---|---|---|
|  | C6-content (wt %) | Flash point (° C.) | Kinematic viscosity (cSt@40° C.) | C8-9 content (wt %) | Flash point (° C.) | Kinematic viscosity (cSt@40° C.) |
| Example 1 | 0.08 | 42 | 115 | 3.6 | 85 | 370 |
| Example 2 | 0.04 | 45 | 115 | 4.1 | 85 | 360 |
| Example 3 | 0.01 | 47.5 | 120 | 5.4 | 84.5 | 345 |
| Example 4 | 0 | 51.5 | 125 | 8.2 | 84 | 310 |
| Comparative Example 1 | — | — | — | 3.6 | 85 | 370 |
| Comparative Example 2 | 0.08 | 42 | 115 | — | — | — |
| Comparative Example 3 | 1.6 | 25 | 110 | 1.7 | 87 | 425 |
| Comparative Example 4 | 1.6 | 25 | 110 | 3.6 | 85 | 370 |
| Comparative Example 5 | 0.08 | 42 | 115 | 1.7 | 87 | 428 |

TABLE 3

|  | Temperature at the time of supply to combustion chamber (° C.) | Flash point (° C.) | Kinematic viscosity (cSt) | Whether process operating standards were satisfied |
|---|---|---|---|---|
| Example 1 | 42.2 | 68 | 300 | ○ |
| Example 2 | 41.8 | 70 | 300 | ○ |
| Example 3 | 41.5 | 72.5 | 300 | ○ |
| Example 4 | 40.3 | 76 | 300 | ○ |
| Comparative Example 1 | 63 | 85 | 300 | X |
| Comparative Example 2 | 23.4 | 42 | 300 | X |
| Comparative Example 3 | 49 | 61.5 | 300 | X |
| Comparative Example 4 | 42.1 | 61 | 300 | X |
| Comparative Example 5 | 49.3 | 69 | 300 | X |

In Table 3, as to whether the process operating standards are met, for the stream supplied to the combustion chamber in each of Examples 1 to 4 and Comparative Examples 1 to 5, if the temperature of the stream at the time of supply to the combustion chamber at which the kinematic viscosity of the stream at the time of supply to the combustion chamber is 300 cSt is lower than the flash point by 25° C. or more, it was expressed as ○, and if not, it was expressed as x.

Referring to Tables 1 to 3, in Examples 1 to 4 in which according to the method for preparing synthesis gas of the present invention, the flow rate (GF) of the side discharge stream from the gasoline fractionator 10, the flow rate (FF) of the supply stream, the flow rate (GS) of the first steam stream, and the flow rate (FS) of the second steam stream were adjusted to control G and F to be within the appropriate ranges, the kinematic viscosity and the flash point of the mixed oil stream were able to be adjusted.

Specifically, in Examples 1 to 4 in which the mixed oil stream was supplied to the combustion chamber for the gasification process (S2) under the conditions in which G is controlled to 0.5 or more and F is controlled to 0.035 or less, it was confirmed that the content of C6– hydrocarbons in the PGO stream was controlled to 0.1 wt % or less, and the content of C8 and C9 hydrocarbons in the PFO stream was controlled to 3 wt % or more, whereby when the mixed oil stream of the PGO stream and the PFO stream was supplied to the combustion chamber, the flash point of the mixed oil stream was higher than the temperature of the mixed oil stream at the time of supply to the combustion chamber by 25° C. or more and the kinematic viscosity of the mixed oil stream was in a range of 300 cSt or less at the temperature of the mixed oil stream at the time of supply to the combustion chamber. By having both the flash point and the kinematic viscosity range as such, the process operating conditions for use as the raw material of the gasification process (S2) were satisfied.

However, in Comparative Example 1 in which only the PFO stream was supplied to the combustion chamber instead of the mixed oil stream of the PFO stream and the PGO stream of Example 1 or in Comparative Example 2 in which only the PGO stream was supplied to the combustion chamber, it was confirmed that though G or F was satisfied as in the present invention, the temperature satisfying both the kinematic viscosity and the flash point in the appropriate range described above did not exist. Consequently, it was found that it is difficult to use the PGO stream or the PFO stream alone as the raw material of the synthesis gas.

In addition, also in Comparative Examples 3 to 5 in which the mixed oil stream of the PGO stream and the PFO stream was supplied to the combustion chamber as the raw material of the gasification process (S2), but any one or more of G and F conditions were not satisfied as in the present invention, it was confirmed that the temperature satisfying both the kinematic viscosity and the flash point in the appropriate range described above did not exist. As such, in the case of Comparative Examples 1 to 5 in which any one or more of the kinematic viscosity and the flash point in the appropriate ranges were not satisfied, it was confirmed that the process operating conditions for use as the raw material of the gasification process (S2) were not met.

When the raw material of the gasification process (S2) was supplied to the combustion chamber at the temperature which did not satisfy any one of the kinematic viscosity and the flash point in the appropriate ranges, a differential pressure in the combustion chamber was raised or atomization was not performed well to deteriorate combustion performance, and an explosion risk was increased due to excessive oxygen, or flame may occur in the burner before a combustion reaction occurs, and an explosion risk was present by a backfire phenomenon of flame in the combustion chamber and refractories in the combustion chamber may be damaged.

The invention claimed is:

1. A method for preparing synthesis gas, the method comprising:
   supplying a cracked gas stream discharged from a cracking furnace of a naphtha cracking center (NCC) process to a gasoline fractionator;
   supplying a side discharge stream of the gasoline fractionator to a first stripper, operating the first stripper under conditions in which a first steam stream is supplied to the first stripper, and separating a pyrolysis gas oil (PGO) stream including a PGO from a lower portion of the first stripper;
   splitting a lower discharge stream from the gasoline fractionator into a reflux stream and a supply stream, supplying the supply stream to a second stripper, and operating the second stripper under conditions in which a second steam stream is supplied to the second stripper, and separating a pyrolysis fuel oil (PFO) stream including a PFO from a lower portion of the second stripper; and
   supplying a mixed oil stream of the PGO stream and the PFO stream to a combustion chamber for a gasification process to obtain synthesis gas,
   wherein the method satisfies the following Equations 1 and 2:
   $$G \geq 0.5, G = GS/GF \quad \text{[Equation 1]}$$
   $$F \leq 0.035, F = FS/FF \quad \text{[Equation 2]}$$
   wherein GF is a flow rate of the side discharge stream from the gasoline fractionator, GS is a flow rate of the first steam stream, FF is a flow rate of the supply stream, and FS is a flow rate of the second steam stream.

2. The method for preparing synthesis gas of claim 1, wherein G is 0.5 to 2.

3. The method for preparing synthesis gas of claim 1, wherein F is 0.001 to 0.035.

4. The method for preparing synthesis gas of claim 1, wherein a temperature of the side discharge stream from the gasoline fractionator is 120° C. to 180° C., and an operating pressure of the first stripper is 0.5 kg/cm2g to 3 kg/cm2g.

5. The method for preparing synthesis gas of claim 1, wherein a temperature of the lower discharge stream from the gasoline fractionator is 150° C. to 300° C., and an operating pressure of the second stripper is 0.6 kg/cm2g to 3.1 kg/cm2g.

6. The method for preparing synthesis gas of claim 1, wherein each pressure of the first steam stream and the second steam stream is 2 kg/cm2g to 20 kg/cm2g.

7. The method for preparing synthesis gas of claim 1, wherein the mixed oil stream has a kinematic viscosity at the time of supply to the combustion chamber of 300 cSt or less, and
   wherein the mixed oil stream has a flash point higher than a temperature at the time of supply to the combustion chamber by 25° C. or more.

8. The method for preparing synthesis gas of claim 1, wherein the temperature of the mixed oil stream at the time of the supply to the combustion chamber is 20° C. to 90° C.

9. The method for preparing synthesis gas of claim 1, wherein a content of hydrocarbons having 6 or less carbon atoms in the PGO stream is 0.1 wt % or less, and
   a content of hydrocarbons having 8-9 carbon atoms in the PFO stream is 3 wt % or more.

10. The method for preparing synthesis gas of claim 1, wherein the PGO stream has a flash point of 40 to 70° C., and
    wherein the PFO stream has a flash point of 65 to 190° C.

11. The method for preparing synthesis gas of claim 1, wherein the PGO stream has a kinematic viscosity at 40° C. of 5 to 220 cSt, and
    wherein the PFO stream has a kinematic viscosity at 40° C. of 250 to 70,000 cSt.

12. The method for preparing synthesis gas of claim 1, wherein the lower discharge stream from the gasoline fractionator is discharged from a stage at 90% or more relative to the total number of stages of the gasoline fractionator, and
    wherein the side discharge stream from the gasoline fractionator is discharged from a stage at 10% to 70% relative to the total number of stages of the gasoline fractionator.

* * * * *